(12) United States Patent
Chen et al.

(10) Patent No.: US 12,659,537 B2
(45) Date of Patent: Jun. 16, 2026

(54) ELECTRONIC SYSTEM AND CONTROL METHOD THEREOF

(71) Applicant: Coretronic Corporation, Hsin-Chu (TW)

(72) Inventors: Kun-Hong Chen, Hsin-Chu (TW);
Yi-Jun Liao, Hsin-Chu (TW);
Yu-Hsuan Hsieh, Hsin-Chu (TW);
Yun-Shih Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/889,298

(22) Filed: Sep. 18, 2024

(65) Prior Publication Data

US 2025/0106458 A1 Mar. 27, 2025

Related U.S. Application Data

(60) Provisional application No. 63/539,824, filed on Sep. 22, 2023.

(30) Foreign Application Priority Data

Dec. 1, 2023 (CN) .......................... 202311643752.5

(51) Int. Cl.
*H04N 21/41* (2011.01)
*G10L 15/183* (2013.01)
(Continued)

(52) U.S. Cl.
CPC ....... *H04N 21/4104* (2013.01); *G10L 15/183* (2013.01); *G10L 15/22* (2013.01);
(Continued)

(58) Field of Classification Search
CPC ......... H04N 21/4104; H04N 21/42203; H04N 9/31; G10L 15/183; G10L 15/22; G10L 15/30
See application file for complete search history.

(56) References Cited

U.S. PATENT DOCUMENTS 4,570,232 A * 2/1986 Shikano .................. G10L 15/12
704/241
5,598,557 A * 1/1997 Doner ................. G06F 16/3346
707/999.005
(Continued)

FOREIGN PATENT DOCUMENTS

CN 107205075 9/2017
CN 107765838 3/2018
(Continued)

OTHER PUBLICATIONS

"Notice of Reasons for Refusal of Japan Counterpart Application", issued on Aug. 22, 2025, p. 1-p. 4.
(Continued)

*Primary Examiner* — Michael B. Pierorazio
(74) *Attorney, Agent, or Firm* — JCIPRNET

(57) ABSTRACT

An electronic system and a control method thereof are provided. The electronic system includes a projection device and at least one peripheral device. The control method of the electronic system includes: sending an original instruction to a natural language model through the projection device, wherein the projection device has a communication interface and is communicatively connected to the at least one peripheral device through the communication interface; in response to the original instruction corresponding to an operation of the at least one peripheral device, generating at least one standard instruction according to the original instruction through the natural language model; and controlling the at least one peripheral device through the pro-
(Continued)

jection device to perform the operation corresponding to the original instruction according to the at least one standard instruction.

15 Claims, 7 Drawing Sheets

(51) Int. Cl.
| | |
|---|---|
| *G10L 15/22* | (2006.01) |
| *G10L 15/30* | (2013.01) |
| *H04N 9/31* | (2006.01) |
| *H04N 21/422* | (2011.01) |

(52) U.S. Cl.
CPC .............. *G10L 15/30* (2013.01); *H04N 9/31* (2013.01); *H04N 21/42203* (2013.01)

(56) References Cited

U.S. PATENT DOCUMENTS

| | | | | | |
|---|---|---|---|---|---|
| 6,085,160 | A * | 7/2000 | D'hoore | ............... | G10L 15/005 704/277 |
| 6,442,518 | B1 * | 8/2002 | Van Thong | ............. | G10L 15/26 704/235 |
| 6,473,778 | B1 * | 10/2002 | Gibbon | ................ | G06F 40/103 715/201 |
| 7,047,191 | B2 * | 5/2006 | Lange | .................... | G10L 15/26 704/235 |
| 7,065,524 | B1 * | 6/2006 | Lee | ........................ | G16H 50/50 706/45 |
| 7,092,888 | B1 * | 8/2006 | McCarthy | .......... | G10L 15/1822 704/277 |
| 7,509,385 | B1 * | 3/2009 | Rittmeyer | ............ | G06Q 10/107 715/224 |
| 7,729,917 | B2 * | 6/2010 | Miyamoto | ............. | G10L 15/22 704/275 |
| 7,739,253 | B1 * | 6/2010 | Yanovsky | ........... | G06F 16/9535 707/706 |
| 7,801,910 | B2 * | 9/2010 | Houh | .................... | G06F 16/583 707/765 |
| 7,873,654 | B2 * | 1/2011 | Bernard | ............. | G06F 16/3329 709/219 |
| 7,962,331 | B2 * | 6/2011 | Miller | ................... | G10L 15/193 704/235 |
| 8,121,432 | B2 * | 2/2012 | Dorai | ................. | G06F 16/7844 382/276 |
| 8,131,545 | B1 * | 3/2012 | Moreno | ................. | G10L 15/04 704/235 |
| 8,165,886 | B1 | 4/2012 | Gagnon et al. | | |
| 8,423,363 | B2 * | 4/2013 | Gupta | .................... | G10L 15/22 704/251 |
| 8,572,488 | B2 * | 10/2013 | Phillips | ................ | G06F 3/0482 715/716 |
| 10,573,302 | B2 * | 2/2020 | Lee | ........................ | G08C 17/02 |
| 11,032,620 | B1 * | 6/2021 | Verma | ................ | G10L 15/1822 |
| 11,100,926 | B2 | 8/2021 | Lin et al. | | |
| 11,206,372 | B1 | 12/2021 | Zhang | | |
| 11,509,969 | B2 * | 11/2022 | Verma | ................... | G06F 16/738 |
| 2002/0055950 | A1 * | 5/2002 | Witteman | ............... | G06F 16/40 707/E17.009 |
| 2002/0093591 | A1 * | 7/2002 | Gong | ................. | H04N 21/2368 348/E7.063 |
| 2003/0025832 | A1 * | 2/2003 | Swart | ................. | H04N 21/4828 348/E7.071 |
| 2003/0061028 | A1 * | 3/2003 | Dey | ........................ | G06F 16/40 704/9 |
| 2003/0169366 | A1 * | 9/2003 | Lenzi | ..................... | H04N 7/10 348/461 |
| 2003/0206717 | A1 * | 11/2003 | Yogeshwar | ............ | G11B 27/10 386/328 |
| 2004/0096110 | A1 * | 5/2004 | Yogeshwar | ............. | G06F 16/51 707/E17.031 |

| | | | | | |
|---|---|---|---|---|---|
| 2005/0227614 | A1 * | 10/2005 | Hosking | ................ | H04N 7/165 455/3.06 |
| 2006/0015339 | A1 * | 1/2006 | Charlesworth | ....... | G10L 15/187 704/E15.02 |
| 2007/0124147 | A1 * | 5/2007 | Gopinath | ................ | G10L 15/19 704/E15.021 |
| 2007/0124788 | A1 * | 5/2007 | Wittkoter | ............... | H04N 7/165 348/E7.071 |
| 2007/0214164 | A1 * | 9/2007 | MacLennan | ............ | G06F 16/90 |
| 2008/0066138 | A1 * | 3/2008 | Bishop | .................... | G06F 40/58 725/137 |
| 2008/0255844 | A1 * | 10/2008 | Wu | ........................ | G10L 15/193 704/E15.022 |
| 2008/0266449 | A1 * | 10/2008 | Rathod | .............. | H04N 21/8133 348/E7.001 |
| 2008/0270134 | A1 * | 10/2008 | Miyamoto | ........... | H04N 7/0885 348/E7.001 |
| 2009/0171662 | A1 * | 7/2009 | Huang | ................ | G10L 15/1822 704/E15.041 |
| 2010/0091187 | A1 * | 4/2010 | Topiwalla | .......... | H04N 21/4355 348/E7.003 |
| 2011/0022386 | A1 * | 1/2011 | Gatzke | .................... | G10L 15/26 704/235 |
| 2011/0040559 | A1 * | 2/2011 | Kim | ...................... | G10L 21/055 704/271 |
| 2012/0016678 | A1 * | 1/2012 | Gruber | ................ | G06F 16/9537 704/E21.001 |
| 2012/0101817 | A1 * | 4/2012 | Mocenigo | ............. | G10L 15/063 704/E15.001 |
| 2012/0253799 | A1 * | 10/2012 | Bangalore | ............. | G10L 15/183 704/E15.001 |
| 2014/0280983 | A1 | 9/2014 | Paluch et al. | | |
| 2015/0033275 | A1 | 1/2015 | Natani et al. | | |
| 2015/0261496 | A1 | 9/2015 | Faaborg et al. | | |
| 2018/0158460 | A1 | 6/2018 | Lee et al. | | |
| 2019/0132436 | A1 | 5/2019 | Jang et al. | | |
| 2020/0105258 | A1 | 4/2020 | Lin et al. | | |
| 2022/0107852 | A1 | 4/2022 | Kulkarni et al. | | |
| 2023/0029088 | A1 * | 1/2023 | Decrop | ................. | G10L 15/063 |

FOREIGN PATENT DOCUMENTS

| | | |
|---|---|---|
| CN | 108319171 | 7/2018 |
| CN | 108496343 | 9/2018 |
| CN | 110808041 | 2/2020 |
| CN | 112970059 | 6/2021 |
| CN | 113359525 | 9/2021 |
| CN | 115243018 | 10/2022 |
| CN | 116203853 | 6/2023 |
| JP | 2016095383 | 5/2016 |
| JP | 2016151608 | 8/2016 |
| JP | 2019086903 | 6/2019 |
| JP | 2019144740 | 8/2019 |
| JP | 2019191751 | 10/2019 |
| JP | 2020053040 | 4/2020 |
| JP | 2022112292 | 8/2022 |
| KR | 20140037519 | 3/2014 |
| TW | 202013141 | 4/2020 |
| TW | 202213086 | 4/2022 |

OTHER PUBLICATIONS

"Office Action of Japan Related Application, Application No. 2024122331", issued on Jun. 24, 2025, p. 1-p. 6.
"Search Report of Europe Related Application, Application No. 24190662.7", issued on Dec. 13, 2024, p. 1-p. 11.
Hsin-Ya Lai et al., "Projection System, Terminal Device, Projection Device and Control Method Thereof", Unpublished U.S. Appl. No. 18/784,932, filed Jul. 26, 2024.
"Office Action of Taiwan Counterpart Application", issued on Jan. 21, 2025, p. 1-p. 8.
"Search Report of Europe Counterpart Application", issued on Feb. 4, 2025, p. 1-p. 12.

(56) References Cited

OTHER PUBLICATIONS

Office Action of related U.S. Appl. No. 18/784,932, issued on Jan. 21, 2026, p. 1-p. 24.

* cited by examiner

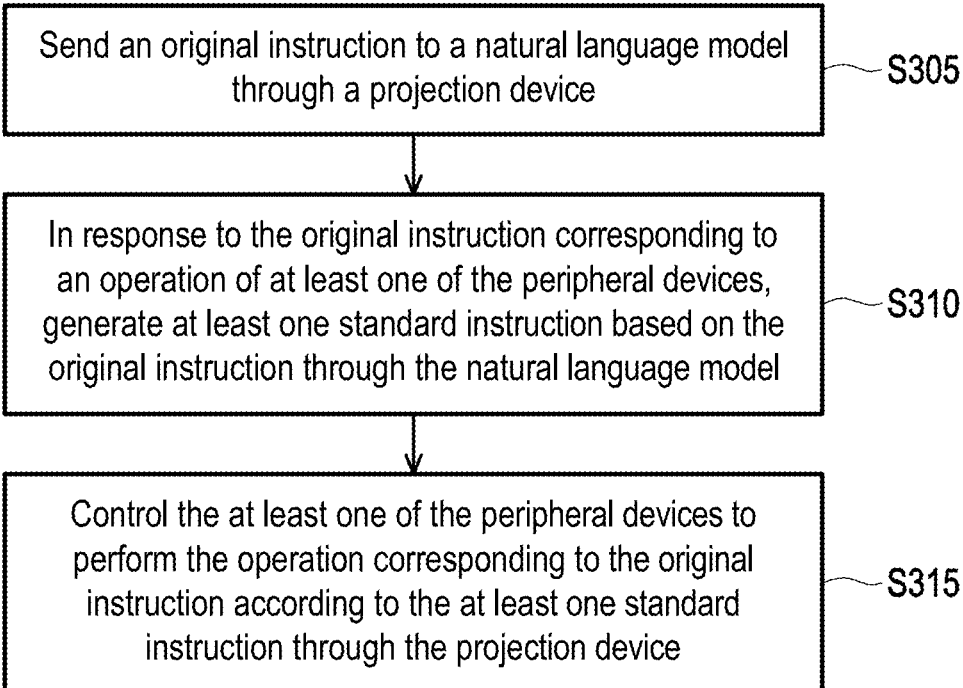

Send an original instruction to a natural language model through a projection device —S305

In response to the original instruction corresponding to an operation of at least one of the peripheral devices, generate at least one standard instruction based on the original instruction through the natural language model —S310

Control the at least one of the peripheral devices to perform the operation corresponding to the original instruction according to the at least one standard instruction through the projection device —S315

FIG. 3

ELECTRONIC SYSTEM AND CONTROL METHOD THEREOF

CROSS-REFERENCE TO RELATED APPLICATION

This application claims the priority benefit of U.S. provisional application Ser. No. 63/539,824, filed on Sep. 22, 2023, and China application serial no. 202311643752.5, filed on Dec. 1, 2023. The entirety of each of the above-mentioned patent applications is hereby incorporated by reference herein and made a part of this specification.

BACKGROUND

Technical Field

The disclosure relates to a control mechanism, and particularly relates to an electronic device capable of controlling peripheral devices and a control method thereof.

Description of Related Art

A current control method of a projection device is implement by a user by manually operating a remote controller of the projection device or operating a human-machine interface on the projection device to operate relevant projection settings of the projection device. Therefore, the conventional control method of the projection device is quite inconvenient.

When the user wants to control a peripheral device coupled to the projection device, the user needs to confirm a type and a connection status of the peripheral device connected to the projection device before performing manual control. Moreover, each functional operation of the peripheral device needs to be operated independently, so that the conventional way of controlling the peripheral device is quite inconvenient.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure is directed to an electronic system and a control method thereof, which use a projection device as a central control device to control peripheral devices connected thereto.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to achieve one or a portion of or all of the objects or other objects, an embodiment of the disclosure provides a control method of an electronic system, the electronic system includes a projection device and at least one peripheral device, and the control method includes: sending an original instruction to a natural language model through the projection device, wherein the projection device has a communication interface and is communicatively connected to the at least one peripheral device through the communication interface; in response to the original instruction corresponding to an operation of the at least one peripheral device, generating at least one standard instruction according to the original instruction through the natural language model; and controlling the at least one peripheral device through the projection device to perform the operation corresponding to the original instruction according to the at least one standard instruction.

In order to achieve one or a portion of or all of the objects or other objects, an embodiment of the disclosure provides an electronic system including at least one peripheral device and a projection device for receiving an original instruction. The projection device includes: a communication interface communicatively connected to the at least one peripheral device; and a processor coupled to the communication interface. The processor is configured to: in response to the original instruction corresponding to an operation of the at least one peripheral device, receive at least one standard instruction corresponding to the original instruction through the communication interface; and control the at least one peripheral device to perform the operation corresponding to the original instruction according to the at least one standard instruction.

According to the above descriptions, the electronic system and the control method thereof in the disclosure may identify the original instruction of the user to learn the operation of the peripheral device corresponding to the original instruction, so as to generate the corresponding standard instruction, and the projection device controls the peripheral device to execute the corresponding operation based on the standard instruction. Accordingly, the projection device may be configured to control the peripheral device connected to the projection device.

BRIEF DESCRIPTION OF THE DRAWINGS

FIG. 3 is a flowchart of a control method of an electronic system according to the second embodiment of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "left," "right," "front," "back," etc., is used with reference to the orientation of the Figure(s) being described and are not intended to be limiting of the disclosure.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
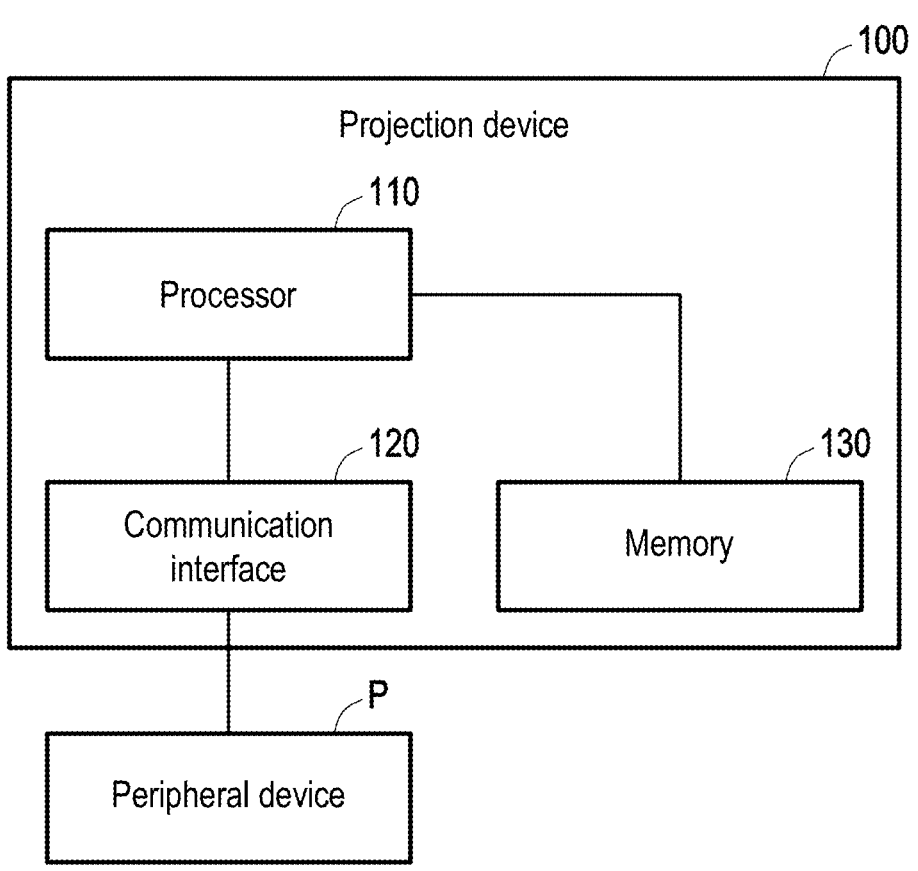
FIG. 1 is a schematic diagram of an electronic system according to a first embodiment of the disclosure.

FIG. 1 is a schematic diagram of an electronic system according to a first embodiment of the disclosure. Referring to FIG. 1, the electronic system includes a peripheral device P and a projection device 100. The projection device 100 includes a processor 110, a communication interface 120 and a memory 130. The processor 110 is coupled to the communication interface 120 and the memory 130. The projection device 100 is, for example, a projector.

In the embodiment, the number of processors 110 may be one or more. The processor 110 is, for example, a central processing unit (CPU), a physical processing unit (PPU), a programmable microprocessor, an embedded control chip, or a digital signal processor (DSP), an application specific integrated circuit (ASIC) or other similar devices.

The communication interface 120 includes at least one connector to connect at least one peripheral device, and in FIG. 1, one peripheral device P is taken as an example for description, and the number of the peripheral devices P may be one or plural. The communication interface 120 may include at least one of a Bluetooth (BT) connector, a high definition multimedia interface (HDMI) port, a local area network (LAN) connection port, a network card connector, an audio source input and output port, and a universal serial bus (USB) port. The peripheral device P is, for example, an electronic device connected via Bluetooth, an electronic device connected via HDMI, an electronic device connected via Wi-Fi, or an electronic device connected via USB, etc.

The electronic device (the peripheral device P) connected via Bluetooth adopt a Bluetooth communication protocol, and the electronic device is, for example, a Bluetooth microphone, a Bluetooth speaker, a Bluetooth loudspeaker, a Bluetooth amplifier, a Bluetooth headset and other electronic devices. The electronic device (the peripheral device P) connected via HDMI is, for example, an HDMI-equipped set-top box, a multimedia player, a computer, a smartphone, a game console, a speaker, an amplifier, a television, and other electronic devices. The electronic device (the peripheral device P) connected via Wi-Fi is, for example, an electronic device connected to the projection device 100 by using a Wi-Fi communication protocol, or an electronic device with a Wi-Fi function, such as an electronic device with a wireless network card, a router, a switch. The electronic device (the peripheral device P) connected via USB is, for example, a set-top box, a multimedia player, a computer, a smart phone, a game console, a speaker, an amplifier and other electronic devices with USB ports. The peripheral device P may also be other household devices (for example, air conditioners, lights, etc.) connected to the projection device 100 through a local area network, Bluetooth, etc., so that the projection device 100 is used as a central control device of smart home Internet of Things for control.

The peripheral device P of the embodiment may also include an input device. The input device is, for example, a sound collecting device (microphone), a keyboard, a touch panel, a mouse or a remote control, etc. The input device is configured to receive an original instruction from a user. The input device is coupled to the communication interface 120, and the communication interface 120 is configured to receive the original instruction from the input device. For example, the communication interface 120 is connected to the sound collecting device, and the original instruction (a voice instruction) received by the sound collecting device is transmitted to the processor 110 through the communication interface 120. For example, the communication interface 120 is connected to a keyboard, and the original instruction (a text instruction) received by the keyboard is sent to the processor 110 through the communication interface 120. For example, the communication interface 120 is connected to an electronic device connected via Wi-Fi, and the original instruction (the voice instruction or text instruction) received by the electronic device is transmitted to the processor 110 through the communication interface 120.

The memory 130 may be any type of fixed or removable random access memory (RAM), read-only memory (ROM), flash memory, hard disk or other similar devices or a combination of these devices. The memory 130 includes one or a plurality of program instructions. After being installed, the program instructions may be executed by the processor 110 to implement a following control method of the electronic system.

In the embodiment, the processor 110 receives at least one standard instruction corresponding to the original instruction through the communication interface 120 in response to the original instruction corresponding to an operation of the peripheral device P, and the processor 110 controls the peripheral device P to perform the operation corresponding to the original instruction based on the at least one standard instruction.

In an embodiment, the electronic system may further include an environment sensing device, such as a light sensor and a decibel meter. The environment sensing device is configured to sense changes of a surrounding environment. The projection device 100 may receive information input from the environment sensing device to serve as reference information for the electronic system to control the projection device 100 and/or the peripheral device P. The light sensor is, for example configured to sense an environmental brightness, and the decibel meter is configured to sense an environmental sound volume. The electronic system may use the environment sensing device to assist in adjusting a brightness, a color gamut, a volume, etc., of the projection device 100 and/or the peripheral device P.

Figure 2:
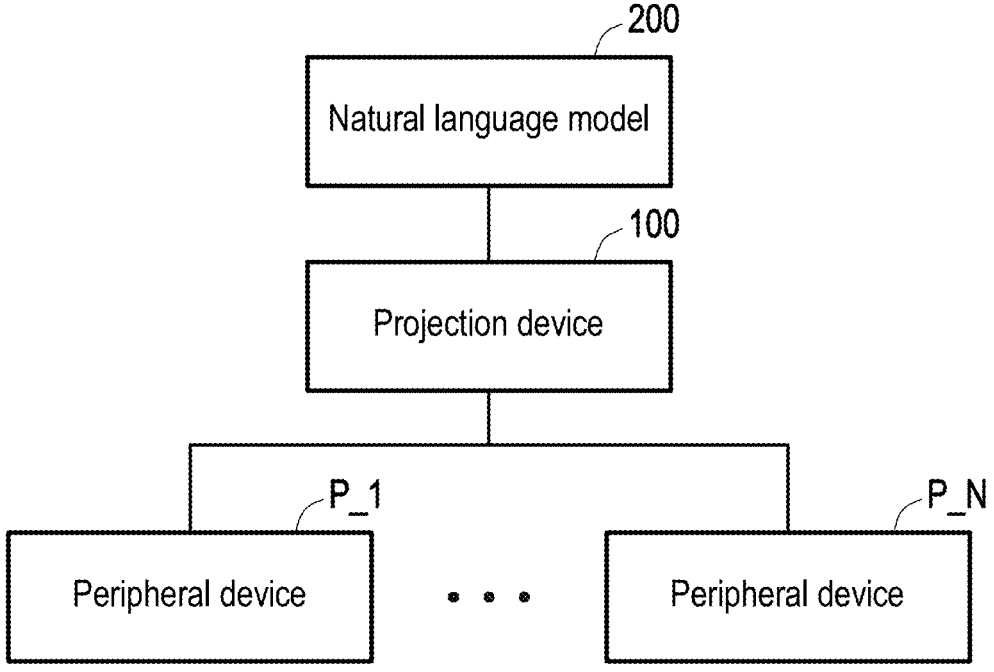
FIG. 2 is a schematic diagram of an electronic system according to a second embodiment of the disclosure.

FIG. 2 is a schematic diagram of an electronic system according to a second embodiment of the disclosure. Referring to FIG. 2, the electronic system of the second embodiment includes a projection device 100, at least one peripheral device P_1 to P_N, and a natural language model 200. The projection device 100 of the first embodiment may be used in the second embodiment. The projection device 100 may communicate with the natural language model 200 through the communication interface 120 in a wireless or wired manner.

In the embodiment, the natural language model 200 is, for example, a chatbot with a machine learning algorithm. The chatbot is, for example, any pretrained chatbot such as chat generative pre-trained transformer (ChatGPT), Microsoft Bing, Google Bard, or ERNIE Bot, or may be a dedicated chatbot trained based on domain-specific data. The natural language model 200 may also be a separately trained language model. The natural language model 200 may be configured to perform natural language processing (NLP), natural language processing and understanding, dialogue management, speech-to-text and text-to-speech, etc. The natural language model 200 may recognize multiple languages and multiple accents. The natural language model 200 may be disposed in a cloud server. In an embodiment, the natural language model 200 may also be disposed in the projection device 100, and the natural language model 200 is coupled to the processor 110 of the projection device 100.

FIG. 3 is a flowchart of a control method of an electronic system according to the second embodiment of the disclosure. Referring to FIG. 3, in step S305, the original instruction is sent to the natural language model 200 through the projection device 100. Then, in step S310, in response to the original instruction corresponding to the operation of at least one of the peripheral device(s) P_1 to P_N, the natural language model 200 generates at least one standard instruction based on the original instruction. In step S315, the projection device 100 controls at least one of the peripheral device(s) P_1 to P_N to perform the operation corresponding to the original instruction according to the at least one standard instruction. For example, taking control of the peripheral device P_1 as an example, the projection device 100 sends a corresponding control signal to a control circuit (a processor) of the peripheral device P_1 through the processor 110, and performs the corresponding operation through the control circuit (the processor) of the peripheral device P_1.

In an embodiment, the original instruction may (simultaneously) control the projection device 100 and the peripheral device(s) P_1 to P_N. In response to the original instruction (simultaneously) corresponding to an operation of at least one of the projection device 100 and the peripheral device(s) P_1 to P_N, the natural language model 200 generates at least one standard instruction based on the original instruction. The projection device 100 controls at least one of the projection device 100 and the peripheral device(s) P_1 to P_N to perform the operation corresponding to the original instruction according to the at least one standard instruction. The original instruction issued by the user may only control the operation of at least one of the peripheral device(s) P_1 to P_N, or may (simultaneously) control the operation of the projection device 100 and at least one of the peripheral device(s) P_1 to P_N.

In an embodiment, the natural language model 200 may generate the at least one standard instruction based on the original instruction, a projector rule instruction, and at least one peripheral device rule instruction. The projector rule instruction is configured to make the standard instruction generated by the natural language model 200 conforming to operations executable by the projection device 100, and the peripheral device rule instruction is configured to make the standard instruction generated by the natural language model 200 conforming to operations executable by at least one of the peripheral device(s) P_1 to P_N. In the embodiment, the projector rule instruction and the peripheral device rule instruction may be stored in the memory 130 of the projection device 100. The peripheral device rule instruction includes at least one of a product type of a corresponding one of the peripheral devices and a description (for example, a connection method) of the communication interface 120 connected to the corresponding one of the peripheral devices.

The processor 110 of the projection device 100 may convert the at least one (received) standard instruction into a control code that the projection device 100 may recognize and execute. Alternatively, the natural language model 200 or the cloud server may also convert the at least one (received) standard instruction into the control code that the projection device 100 may recognize and execute.

Figure 4:
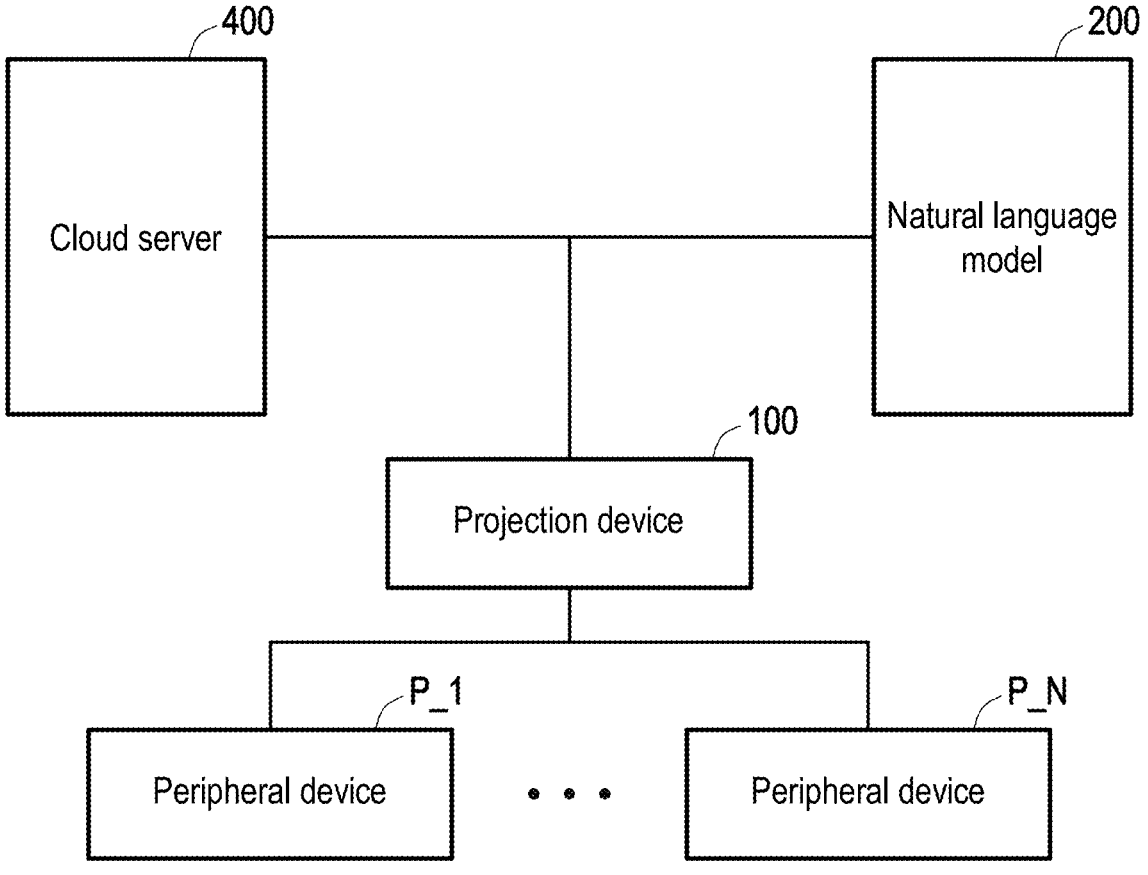
FIG. 4 is a schematic diagram of an electronic system according to a third embodiment of the disclosure.

FIG. 4 is a schematic diagram of an electronic system according to a third embodiment of the disclosure. Referring to FIG. 4, the electronic system of the third embodiment includes a projection device 100, peripheral device(s) P_1 to P_N, a natural language model 200 and a cloud server 400. The projection devices 100 of the first and second embodiments and the natural language model 200 of the second embodiment may be used in the third embodiment. The projection device 100, the natural language model 200 and the cloud server 400 may communicate with each other through a wired and/or a wireless communication manner. The wired communication manner is, for example, a cable. The wireless communication manner includes, for example, Wi-Fi, Bluetooth, etc. For example, the projection device 100, the natural language model 200 and the cloud server 400 may be connected through network transmission. The natural language model 200 may be installed in the cloud server 400 and/or a third-party cloud server. The cloud server 400 and/or the third-party cloud server may include a processor (or processors), a communication device, and a storage device. The storage device of the cloud server 400 and/or the third-party cloud server is, for example, configured to store a chatbot (the natural language model 200) with a machine learning algorithm, and the processor of the cloud server 400 and/or the third-party cloud server is, for example, used to execute the above algorithm. The communication device of the cloud server 400 and/or the third-party cloud server is communicatively connected to the projection device 100 and the natural language model 200.

Figure 5:
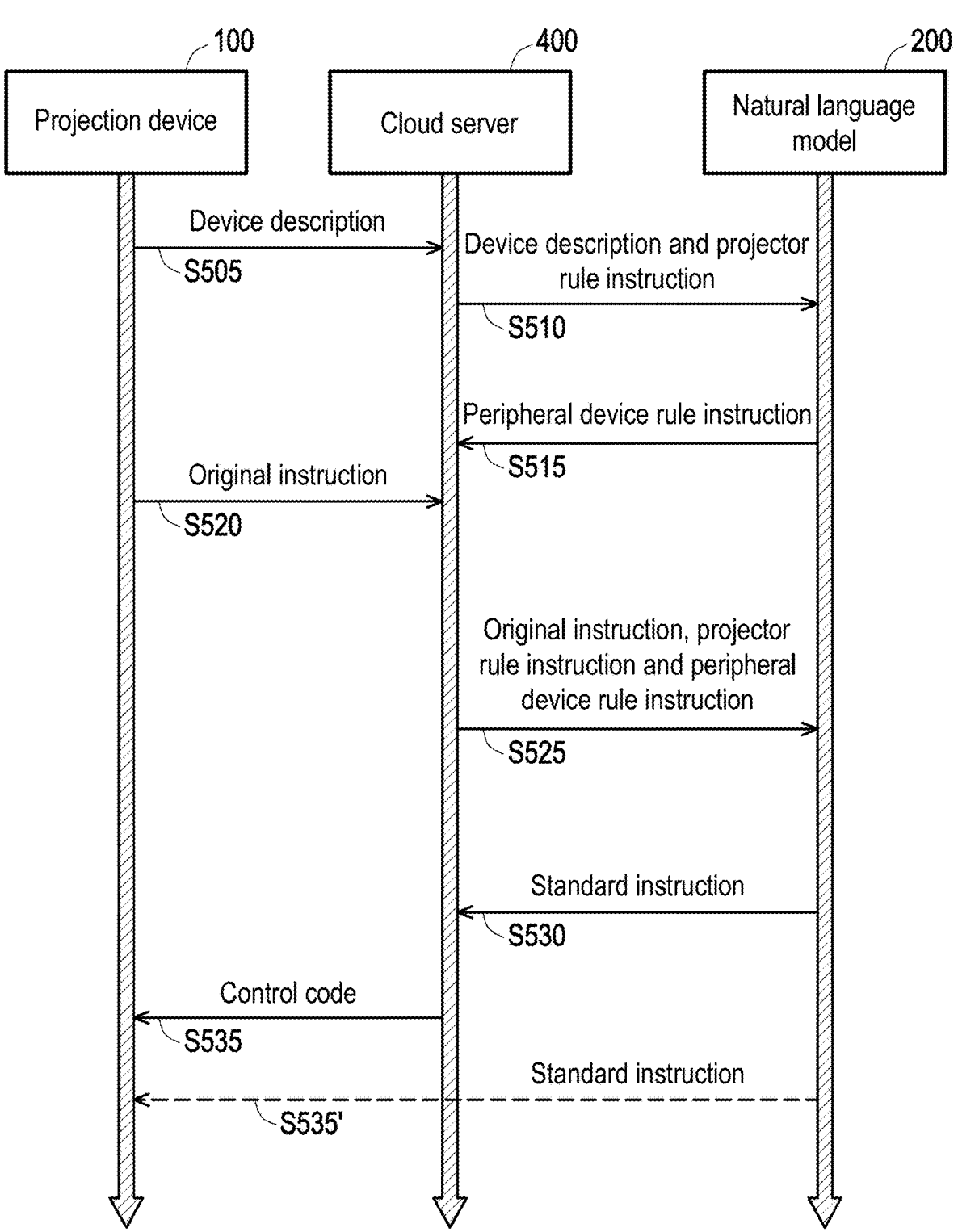
FIG. 5 is a flowchart of a control method of an electronic system according to the third embodiment of the disclosure.

FIG. 5 is a flowchart of a control method of an electronic system according to the third embodiment of the disclosure. Referring to FIG. 5, in step S505, the projection device 100 obtains device description(s) of at least one of the peripheral device(s) P_1 to P_N connected to the communication interface 120, and transmits the device description(s) to the cloud server 400.

The device description(s) of the peripheral device(s) P_1 to P_N may be a device name, an on-screen display (OSD) name, a general framework name, etc. The device description(s) may have characteristics of a brand or the device. The device description(s) of an electronic device (the peripheral device(s) P_1 to P_N) connected via HDMI is, for example, "XXXBD", "AndroidTV", "TVDongle", "AppleTV", and "GameStation". The device description(s) of an electronic device connected via Bluetooth or Wi-Fi is, for example, a device model or a string containing a brand, such as "BEX1850MH" (a Bluetooth headset), "MITVS26" (a Bluetooth speaker). In an embodiment, the device description(s) may also be displayed on a display interface (such as an on-screen display) of the projection device 100 to let the user know the peripheral device(s) P_1 to P_N currently connected to the projection device 100.

When the peripheral device(s) P_1 to P_N is/are connected to the projection device 100 through the wired or the wireless manner, the peripheral device(s) P_1 to P_N may provide device description(s) of the peripheral device(s) P_1 to P_N to the projection device 100 through connection signals. The projection device 100 may be set to read the device description(s) of the peripheral device(s) P_1 to P_N at predetermined time points (for example, when the projection device 100 is turned on, when a new peripheral device is detected, and every fixed time, etc.), and the projection device 100 may provide the device description(s) to the cloud server 400. One peripheral device has a corresponding device description.

After the projection device 100 transmits the device description(s) to the cloud server 400, in step S510, the cloud server 400 transmits the device description(s) and the projector rule instruction to the natural language model 200 in response to receiving the device description(s) from the projection device 100. The projector rule instruction is, for example, stored in the cloud server 400. The projector rule instruction is configured to restrict the natural language model 200 to generate the peripheral device rule instruction(s) for the device description(s) after receiving the device description(s). After receiving the device description(s) and the projector rule instruction, the natural language model 200 generates the peripheral device rule instruction(s) based on the device description(s) and the projector rule instruction. In step S515, the natural language model 200 transmits the peripheral device rule instruction(s) to the cloud server 400.

In order to enable the electronic system to control the peripheral device(s) P_1 to P_N, it needs to make the natural language model 200 generate at least one standard instruction corresponding to an operation executable by at least one of the peripheral device(s) P_1 to P_N based on the peripheral device rule instruction(s) of at least one of the peripheral device(s) P_1 to P_N. Since the peripheral device(s) P_1 to P_N connected to the projection device 100 may be changed at any time, for example, the user may plug and unplug different electronic devices connected via HDMI according to actual needs, or may connect different electronic devices via Bluetooth or Wi-Fi, etc., each time the original instruction is sent, the device description(s) of the peripheral device(s) P_1 to P_N currently connected to the projection device 100 need(s) to be sent to the natural language model 200 together. Accordingly, the natural language model 200 may provide the standard instructions that may be used to perform operations of the peripheral device(s) P_1 to P_N connected to the projection device 100, thereby preventing the natural language model 200 from providing invalid instructions that cannot be executed.

When the natural language model 200 recognizes the device description(s), the device description(s) may be a product code, a product number or a serial number, etc., of a peripheral device. The projector rule instruction may be configured to require the natural language model 200 to search for the peripheral device(s) P_1 to P_N corresponding to the device description(s) through an internal database or a network, and obtain software and hardware configurations and executable operations of the corresponding peripheral device(s) P_1 to P_N. The natural language model 200 may generate the peripheral device rule instruction(s) based on the obtained software and hardware configurations and executable operations. For example, the device description is "XX_PS5", and the natural language model 200 learns that the corresponding peripheral device P_1 is a "game console", and associates the peripheral device P_1 with a related operation of the "game console" and a connection port connected to the peripheral device P_1. Therefore, even if the original instruction does not explicitly require execution of the operation of the peripheral device connected to the projection device 100 through a certain connection method, as long as the original instruction is related to the "game console", when the natural language model 200 converts the original instruction into the standard instruction, the standard instruction may be a preset instruction for controlling the peripheral device P_1 connected to the connection port associated with the device description "XX_PS5".

In an embodiment, the projector rule instruction provides a predetermined format of the peripheral device rule instruction(s), and when the natural language model 200 recognizes the device description(s), the natural language model 200 fills in a variable part of the predetermined format with product characteristics corresponding to the device description(s), thereby forming the peripheral device rule instruction(s).

In an embodiment, after the natural language model 200 transmits the peripheral device rule instruction(s) to the cloud server 400, the cloud server 400 associates and stores the peripheral device rule instruction(s) with the corresponding projection device 100, or the cloud server 400 associates and stores the peripheral device rule instruction(s) with a user account of the corresponding projection device 100. In other embodiments, the cloud server 400 may also associate information such as a product serial number, an Internet protocol (IP) address, a media access control (MAC) address, etc., with the peripheral device rule instruction(s). The information is used to represent a source of the device description(s). In this way, when the cloud server 400 subsequently receives the original instruction sent by the same projection device 100, the cloud server 400 may transmit the original instruction, the projector rule instruction, and the peripheral device rule instruction(s) associated with the projection device 100 to the natural language model 200.

In an embodiment, the device description(s) may be a description with a fixed format for being recognized by the natural language model 200. The fixed format may refer to a description that is common in the industry and applicable to multiple products. For example, the natural language model 200 determines the respective type(s) of the peripheral device(s) P_1 to P_N and the operation(s) that the peripheral device(s) P_1 to P_N may perform based on the device description(s), and generates the peripheral device rule instruction(s) for each of the peripheral device(s) P_1 to P_N based on determination results. One peripheral device corresponds to one peripheral device rule instruction.

In an embodiment, the instructions for enabling the natural language model 200 to recognize the device description(s) to generate the peripheral device rule instruction(s) may not be included in the projector rule instructions and may be implemented by other rule instructions.

After the user inputs the original instruction to the projection device 100, in step S520, the projection device 100 transmits the original instruction to the cloud server 400. In step S525, in response to receiving the original instruction from the projection device 100, the cloud server 400 transmits the original instruction, the projector rule instruction and the peripheral device rule instruction(s) to the natural language model 200, and the natural language model 200 may analyze the original instruction, and generate a standard instruction that corresponds to the original instruction and may be interpreted by the projection device 100 based on the original instruction, the projector rule instruction, and the peripheral device rule instruction(s).

In the embodiment, the natural language model 200 may generate different standard instructions according to types of the original instructions. The types of original instructions include a single-control instruction, a multi-control instruction, a composite-control instruction, etc. The single-control instruction is an instruction corresponding to the original instruction that only needs to adjust one parameter of the projection device 100 or one of the peripheral device(s) P_1 to P_N or includes only one operation. For example, the original instruction is a single-control instruction for lowering a volume of one of the peripheral device(s) P_1 to P_N or switching one of the connected peripheral device(s) P_1 to P_N. The natural language model 200 may generate the standard instruction corresponding to a single operation. The multi-control instruction is an instruction that corresponds to the original instruction and requires multiple single operations. For example, the original instruction may be a multi-control instruction related to turning down the volume of the peripheral device(s) P_1 to P_N and switching the connected peripheral device(s) P_1 to P_N, etc. The natural language model 200 may generate the standard instruction corresponding to multiple single operations. The composite-control instruction is an instruction corresponding to the original instruction and requiring to adjust multiple parameters of the projection device 100 and/or the peripheral device(s) P_1 to P_N. The original instruction is, for example, a composite-control instruction requiring to adjust a visual effect of a projected image. For example, the original instruction is "Please improve the color of the image." For example, the natural language model 200 generates multiple standard instructions for adjusting multiple parameters such as color gamut, brightness, and sharpness of the projected image.

The projector rule instruction is also used to restrict the natural language model 200 to only output instructions that may be interpreted by the projection device 100 or converted into control codes of the projection device 100. For example, the projector rule instruction may restrict the natural language model 200 to only output a standard instruction executable by the projection device 100, where the standard instruction may be, for example, "power on", "power off", "volume up", "volume down", "connect HDMI1", "connect HDMI2", "turn on audio", "switch HDMI source", etc., or codes thereof, and the projector rule instruction may require the natural language model 200 to parse semantics of the received original instruction and summarize the original instruction into any of the above standard instructions, or into other standard instructions.

The projector rule instruction and the peripheral device rule instruction may include, for example, a set composed of tens, hundreds, or thousands of characters. The projector rule instruction added when the cloud server 400 transmits the original instruction to the natural language model 200 may be the same each time. The cloud server 400 may also optimize the projector rule instruction at any time, for example, increase or decrease a condition number of the projector rule instruction to achieve faster feedback speed, lower cost or more accurate feedback.

In step S530, the natural language model 200 transmits the standard instructions to the cloud server 400. The cloud server 400 converts the standard instructions into corresponding control codes. Then, in step S535, the cloud server 400 transmits the control codes to the projection device 100, and the projection device 100 executes the control codes to control at least one of the peripheral device(s) P_1 to P_N, or the projection device 100 simultaneously control operations of at least one of the peripheral device(s) P_1 to P_N and the projection device 100 according to the control codes. In another embodiment, shown as step S535', the natural language model 200 may transmit the standard instructions to the projection device 100, and the projection device 100 itself converts the standard instructions into corresponding control codes to perform corresponding operations.

In an embodiment, the processor 110 of the projection device 100 may display a control interface in the display interface of the projection device 100, and the user may input the original instruction through the control interface.

The original instruction may be a text instruction or a voice instruction. For example, the control interface includes an option to activate a recording function of a sound collecting device (for example, a microphone) of the projection device 100, and when the sound collecting device is activated, the control interface may receive a voice signal through the sound collecting device. After receiving the voice signal, the projection device 100 converts the voice signal into the original instruction in a text form through the processor 110. Alternatively, the control interface includes an option to enable manual input (a handwriting pad, a touchpad, or a keyboard) to receive the original instruction in the text form from the user.

In other embodiments, the voice signal may also be converted into the original instruction in the text form by a terminal device (such as a smartphone) paired with the projection device 100. For example, after the projection device 100 receives the voice signal, the projection device 100 transmits the voice signal to the paired terminal device, and then the terminal device converts the voice signal into the original instruction in the text form, and transmits the original instruction to the projection device 100. Alternatively, the sound collecting device (such as a microphone) of the terminal device may also be used to receive the voice signal, and after the terminal device converts the voice signal into the original instruction in the text form, the original instruction is sent to the projection device 100, and the projection device 100 uploads the original instruction to the cloud server 400, or the terminal device is coupled to the cloud server 400, and the terminal device may directly upload the original instruction to the cloud server 400.

In other embodiments, after receiving the voice signal, the projection device 100 or the terminal device may transmit the voice signal to the cloud server 400, and the cloud server 400 converts the voice signal into the original instruction in the text form. After the cloud server 400 receives the voice signal, the voice signal in a natural language form may be converted into the original instruction in the text form by a voice recognition model of the cloud server 400.

In other embodiments, the original instruction may be a voice signal in the natural language form input by the user. This voice signal may be directly uploaded to the natural language model 200, and the natural language model 200 may recognize the original instruction in the voice form.

Figure 6:
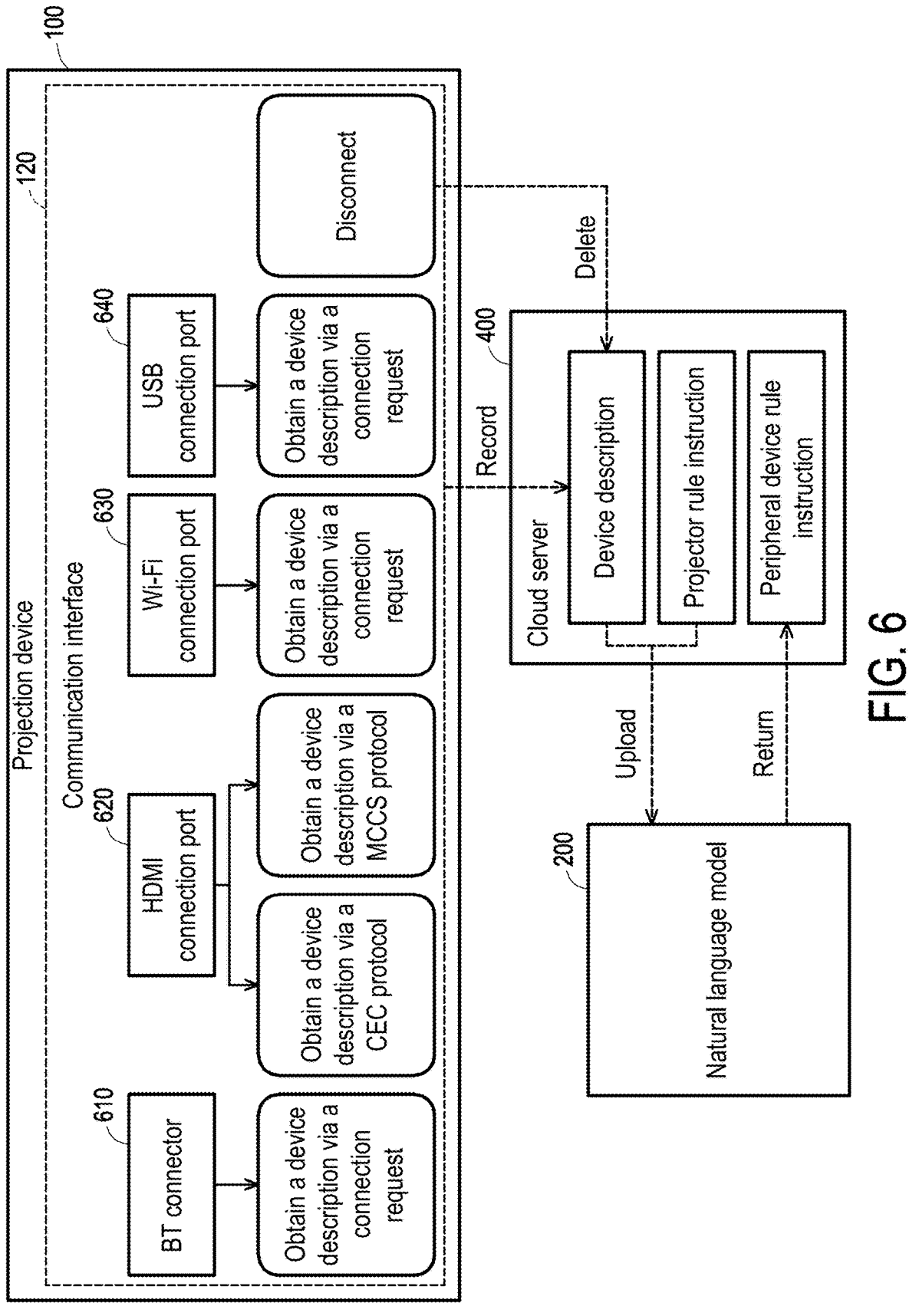
FIG. 6 is a schematic diagram of a peripheral device definition process according to an embodiment of the disclosure.

FIG. 6 is a schematic diagram of a peripheral device definition process according to an embodiment of the disclosure. Referring to FIG. 6, in the embodiment, the communication interface 120 includes, for example, four connectors, which are respectively a BT connector 610, an HDMI connector 620, a Wi-Fi connector 630 and a USB connector 640. When the projection device 100 is turned on, the processor 110 may execute a monitoring program in the projection device 100 to scan the BT connector 610, the HDMI connector 620, the Wi-Fi connector 630 and the USB connector 640, and obtain the device description(s) of the peripheral device(s) P_1 to P_N (respectively) through connection signal(s) of various connection manner. The above-mentioned monitoring program is stored in the memory 130.

Regarding the BT connector 610, the processor 110 of the projection device 100 may obtain the device description(s) through a name when issuing a connection request through the Bluetooth communication protocol. Regarding the HDMI connector 620, the processor 110 of the projection device 100 may obtain the device description(s) through a consumer electronics control (CEC) protocol or a monitor control command set (MCCS) protocol. Regarding the Wi- Fi connector 630, the processor 110 may obtain the device description(s) when issuing a connection request through the Wi-Fi protocol. Regarding the USB connector 640, the processor 110 may obtain the device description(s) when issuing a connection request through the USB protocol. Each one of the peripheral device(s) P_1 to P_N has relevant corresponding descriptions in handshake packets when establishing link with the projection device 100, the processor 110 may retrieve these descriptions as device description(s).

After obtaining the device description(s), the projection device 100 uploads the device description(s) to the cloud server 400. At the same time, a monitoring program of the projection device 100 may detect in real time whether the connections of the BT connector 610, the HDMI connector 620, the Wi-Fi connector 630 and the USB connector 640 are changed. If there is a change, the updated device description(s) is/are re-obtained and the device description(s) is/are uploaded to the cloud server 400. If the monitoring program detects that one of the peripheral devices is disconnected, the projection device 100 may send an update instruction to the cloud server 400 to delete the device description(s) corresponding to the disconnected peripheral device in the cloud server 400.

After receiving the device description(s), the cloud server 400 transmits the device description(s) and the projector rule instructions to the natural language model 200. The device description(s) allow the natural language model 200 to confirm product types of the peripheral device(s) P_1 to P_N, generate corresponding peripheral device rule instruction(s), and send the peripheral device rule instruction(s) back to the cloud server 400 for storage.

The peripheral device rule instruction(s) saved in the cloud server 400 may be overwritten when new peripheral device rule instruction(s) are received. For example, when the peripheral device(s) P_1 to P_N have a change, the projection device 100 may send the device description(s) to the cloud server 400 again, and the cloud server 400 may send the device description(s) and the projector rule instructions to the natural language model 200 again, so that the natural language model 200 generates new peripheral device rule instruction(s) and sends them back to the cloud server 400 to overwrite the old peripheral device rule instruction(s).

The natural language model 200 may generate a single peripheral device rule instruction or a combination of multiple peripheral device rule instructions. The combination of multiple peripheral device rule instructions, for example, refers to generation of respective peripheral device rule instructions for each peripheral device (i.e., each device description). Therefore, when the projection device 100 is connected to a plurality of peripheral devices P_1 to P_N, a plurality of peripheral device rule instructions may be generated. The natural language model 200 may simultaneously generate standard instructions for the projection device 100 and the peripheral devices P_1 to P_N based on an intention of the original instruction and according to the projector rule instructions and the peripheral device rule instructions. Therefore, a cross-device control result may be achieved through a single original instruction.

For example, the projection device 100 is connected to a game console of brand A through the HDMI connector 620, and is connected to an audio device of brand B through the BT connector 610. The processor 110 of the projection device 100 may obtain the device description of the game console as "A_GameStation" through a CEC protocol, and obtain the device description of the audio device as "B_SoundBar" through a Bluetooth communication protocol. The processor 110 may transmit the device descriptions "A_GameStation" and "B_SoundBar" to the cloud server 400 through the communication interface 120, and then the cloud server 400 transmits the device descriptions and the projector rule instructions to the natural language model 200.

The natural language model 200 recognizes the device description "A_GameStation", obtains a product type, a connection port type, executable operations (for example, standby, booting, switching mode) and other information of the device description "A_GameStation" from the network, and generates a peripheral device rule instruction (referred to as "peripheral rule A" hereinafter) corresponding to the device description "A_GameStation". The peripheral rule A is used to restrict the natural language model 200 to only generate a standard instruction for operations executable by the game console of brand A. The natural language model 200 recognizes the device description "B_SoundBar", and its internal database includes information such as product type and executable operations corresponding to the device description "B_SoundBar", and the natural language model 200 generates a peripheral device rule instruction (referred to as "peripheral rule B" hereinafter) corresponding to the device description "B_SoundBar". The peripheral rule B is used to restrict the natural language model 200 to only generate a standard instruction for operations executable by the audio device of brand B.

Then, the natural language model 200 returns the peripheral rule A and the peripheral rule B to the cloud server 400. The cloud server 400 is configured to store a user account, an IP address or a product serial number corresponding to the projection device 100. When the cloud server 400 receives the original instruction, the cloud server 400 transmits the original instruction, the stored projector rule instructions, the peripheral rule A and the peripheral rule B to the natural language model 200. The natural language model 200 generates at least one standard instruction based on requirements on the projection device 100, the game console of brand A, and the audio device of brand B in the original instruction.

Figure 7:
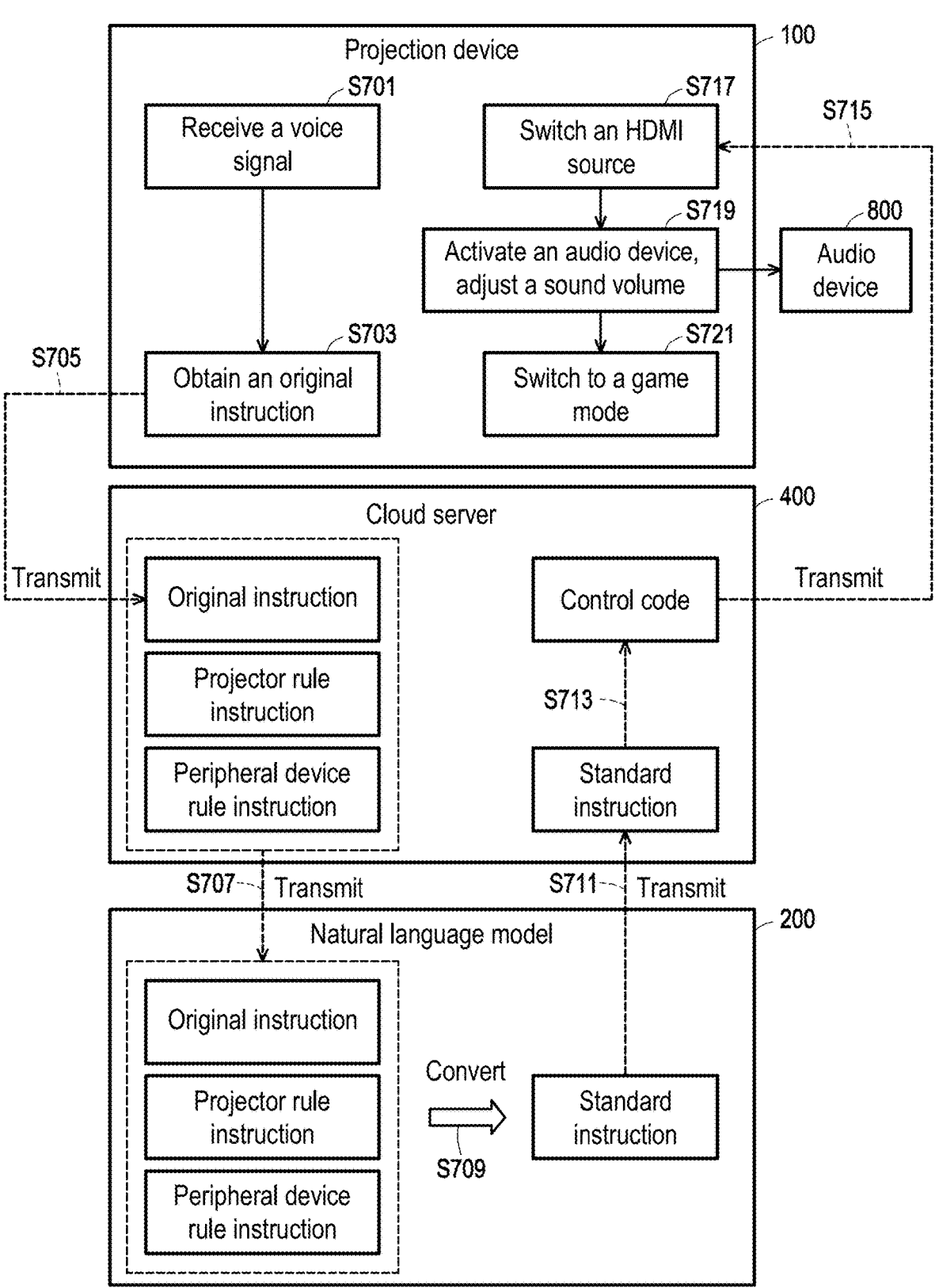
FIG. 7 is a schematic diagram of a voice control process according to an embodiment of the disclosure.

FIG. 7 is a schematic diagram of a voice control process according to an embodiment of the disclosure. Before executing the voice control process, the peripheral device definition process may be executed at least once, so that the natural language model 200 generates the peripheral device rule instructions, and then the process of controlling the peripheral devices may be implemented.

Referring to FIG. 7, in step S701, the projection device 100 receives a voice signal. In step S703, the projection device 100 converts the voice signal into an original instruction in the text form, or directly uses the voice signal as the original instruction. In step S705, the projection device 100 transmits the original instruction to the cloud server 400. In step S707, the cloud server 400 transmits the original instruction, the projector rule instructions, and the peripheral device rule instructions to the natural language model 200. In step S709, the natural language model 200 generates standard instructions for operations corresponding to the original instruction based on the original instruction, the projector rule instructions, and the peripheral device rule instructions.

It is assumed that the original instruction is "I want to play video games", the natural language model 200 may analyze the following points: (1) it is required to switch an input signal source of the projection device 100 to one of the peripheral devices P_1-P_N currently connected to the HDMI connector 620 (such as the game console); (2) it is required to activate one of the peripheral devices P_1 to P_N currently connected to the BT connector 610 (for example, an audio device 800); (3) a projection mode of the projection device 100 should be changed to a "game mode". Therefore, the natural language model 200 may generate following standard instructions according to the projector rule instructions and the peripheral device rule instructions: a first standard instruction of switching the signal input source to the HDMI source; a second standard instruction that starts the audio device 800 and adjusts a volume or sound channel to a value corresponding to the game mode; a third standard instruction of switching the projection mode of the projection device 100 to the game mode.

In step S711, the natural language model 200 transmits the standard instructions to the cloud server 400. In step S713, the cloud server 400 converts the standard instructions into control codes executable by the projection device 100, and in step S715, the control codes are transmitted to the projection device 100.

In step S717, the projection device 100 switches the HDMI source to the game console based on the first standard instruction. For example, it is assumed that an HDMI switch includes a plurality of HDMI input ports (which are respectively connected to the plurality of peripheral devices P_1 to P_N) and one HDMI output port (output multimedia signals may be provided to the display interface of the projection device 100), the projection device 100 uses the processor 110 to send a switching signal to the HDMI switch based on the first standard instruction, and a control circuit of the HDMI switch selects the HDMI input port to be connected based on switches on the HDMI switch, and receives a multimedia signal provided by one of the corresponding peripheral devices P_1 to P_N from the connected HDMI input port. The first standard instruction corresponds to an operation of controlling the projection device 100, and the first standard instruction is, for example, converted according to the original instruction and the projector rule instruction. In other embodiments, if the original instruction includes a specific game among a plurality of games in the game console, the natural language model 200 may also generate the standard instruction adjusting to the corresponding specific game.

In step S719, the projection device 100 activates the audio device 800 based on the second standard instruction, and drives the audio device 800 to adjust a volume. For example, the projection device 100 uses the processor 110 to send an activating signal to the audio device 800 based on the second standard instruction to wake up or activate the audio device 800. Then, the processor 110 sends a corresponding control signal to the control circuit of the audio device 800 based on the second standard instruction, and the control circuit adjusts a volume or a sound channel to a value corresponding to the game mode. The second standard instruction corresponds to an operation of controlling one of the peripheral devices P_1 to P_N (for example, the audio device 800), and the second standard instruction is, for example, converted based on at least the original instruction and the peripheral device rule instruction.

In step S721, the projection device 100 switches its projection mode to the game mode according to the third standard instruction to apply parameter settings of the game mode (for example, brightness, color, etc.). For example, the projection device 100 uses the processor 110 to select the game mode from a plurality of projection modes based on the third standard instruction, and reads parameter settings of the game mode, and then adjusts a light source module, a display module and other components of the corresponding projection device 100 based on the parameter settings. The third standard instruction corresponds to the operation of controlling the projection device 100, and the third standard instruction is, for example, converted according to the original instruction and the projector rule instruction.

In summary, the electronic system and the control method thereof in the disclosure may identify the peripheral devices connected to the projection device, and provide relevant information of the peripheral devices to the natural language model, so that the natural language model generates corresponding standard instructions, and then the projection device controls the peripheral devices based on the standard instructions, where the projection device is used as a center console for the peripheral devices. Accordingly, even if the original instruction issued by the user does not explicitly specify an object to be controlled, the electronic system may still achieve desired results of the user by simultaneously controlling multiple peripheral devices related to the requirements of the original instruction through recognition of the natural language model. In addition, the user no longer needs to remember complicated functional operations, physical connections of multiple external peripheral devices, or designated IP addresses, system names, device codes and other information, and may control the projection device in the most convenient way. For users who operate the projection device for the first time or who are not familiar with the operations of the peripheral devices, the users may also use the peripheral devices without any obstacles and adjust parameter settings to achieve the best viewing, sound and other effects.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A control method of an electronic system, wherein the electronic system comprises a projection device and at least one peripheral device, the control method comprising steps of:

obtaining at least one device description of the at least one peripheral device connected to a communication interface through the projection device, and transmitting the at least one device description to a cloud server, wherein a projector rule instruction is stored in the cloud server;

in response to receiving the at least one device description from the projection device, transmitting the at least one device description and the projector rule instruction to a natural language model through the cloud server; and generating at least one peripheral device rule instruction based on the at least one device description and the projector rule instruction, and transmitting the at least one peripheral device rule instruction to the cloud server through the natural language model, sending an original instruction to the natural language model through the projection device, wherein the projection device has the communication interface and is communicatively connected to the at least one peripheral device through the communication interface;

in response to receiving the original instruction from the projection device, transmitting the original instruction, the projector rule instruction, and the at least one peripheral device rule instruction to the natural language model through the cloud server;

in response to the original instruction corresponding to an operation of the projection device and the at least one peripheral device, generating at least one standard instruction based on the original instruction through the natural language model; and controlling the projection device and the at least one peripheral device through the projection device to perform the operation corresponding to the original instruction according to the at least one standard instruction, wherein the step of generating the at least one standard instruction based on the original instruction through the natural language model comprises:

generating the at least one standard instruction based on the original instruction, the projector rule instruction, and the at least one peripheral device rule instruction through the natural language model, wherein the projector rule instruction is configured to make the at least one standard instruction generated by the natural language model conform to operations executable by the projection device, and the at least one peripheral device rule instruction is configured to make the at least one standard instruction generated by the natural language model conform to operations executable by the at least one peripheral device.

2. The control method of the electronic system as claimed in claim 1, further comprising:

in response to the projection device detecting a change of the at least one peripheral device connected to the communication interface, obtaining at least one updated device description through the projection device and transmitting the at least one updated device description to the cloud server, so that the natural language model generates the corresponding at least one peripheral device rule instruction according to the at least one updated device description.

3. The control method of the electronic system as claimed in claim 1, wherein after the step of transmitting the at least one peripheral device rule instruction to the cloud server through the natural language model, the control method further comprises:

associating and storing the at least one peripheral device rule instruction with the projection device through the cloud server; or associating and storing the at least one peripheral device rule instruction with a user account of the projection device through the cloud server.

4. The control method of the electronic system as claimed in claim 1, wherein the at least one peripheral device rule instruction comprises at least one of a product type of the at least one peripheral device and a description of the communication interface connected to the at least one peripheral device.

5. The control method of the electronic system as claimed in claim 1, further comprising:

in response to receiving a voice signal, converting the voice signal into the original instruction in a text form through the projection device; or in response to receiving the voice signal, converting the voice signal into the original instruction in the text form through a terminal device paired to the projection device; or in response to receiving the voice signal, transmitting the voice signal to a cloud server through the projection device or the terminal device, so that the cloud server converts the voice signal into the original instruction in the text form.

6. The control method of the electronic system as claimed in claim 1, further comprising:

in response to receiving a voice signal, transmitting the voice signal to the natural language model through the projection device, and using the voice signal as the original instruction.

7. The control method of the electronic system as claimed in claim 1, further comprising:

converting the at least one standard instruction into corresponding at least one control code to execute the at least one control code to control the at least one peripheral device through the projection device, wherein the at least one control code corresponds to the operation required by the original instruction; or converting the at least one standard instruction into the corresponding at least one control code, and transmitting the at least one control code to the projection device through a cloud server, so that the projection device executes the at least one control code to control the at least one peripheral device.

8. An electronic system, comprising:

at least one peripheral device;

a projection device, configured to receive an original instruction, the projection device comprising:

a communication interface, communicatively connected to the at least one peripheral device; and a processor, coupled to the communication interface, a cloud server, connected to the projection device through the communication interface, and a natural language model, connected to the projection device through the communication interface, the natural language model is configured to generate at least one standard instruction based on the original instruction, a projector rule instruction, and at least one peripheral device rule instruction, wherein the projector rule instruction is configured to make the at least one standard instruction generated by the natural language model conform to operations executable by the projection device, and the at least one peripheral device rule instruction is configured to make the at least one standard instruction generated by the natural language model conform to operations executable by the at least one peripheral device, wherein the processor is configured to obtain at least one device description of the at least one peripheral device connected to the communication interface through the communication interface, the cloud server stores the projector rule instruction, and the cloud server is configured to transmit the at least one device description and the projector rule instruction to the natural language model in response to receiving the at least one device description from the projection device, the natural language model is configured to generate the at least one peripheral device rule instruction based on the at least one device description and the projector rule instruction, and transmit the at least one peripheral device rule instruction to the cloud server, in response to receiving the at least one device description and the projector rule instruction, and in response to the original instruction corresponding to an operation of the projection device and the at least one peripheral device, the processor is configured to receive the at least one standard instruction corresponding to the original instruction through the communication interface; and control the projection device and the at least one peripheral device to perform the operation corresponding to the original instruction according to the at least one standard instruction.

9. The electronic system as claimed in claim 8, wherein the cloud server is configured to:

in response to receiving the original instruction from the projection device, transmit the original instruction, the projector rule instruction and the at least one peripheral device rule instruction to the natural language model;

the natural language model is configured to:

in response to receiving the original instruction, the projector rule instruction and the at least one peripheral device rule instruction, generate the at least one standard instruction based on the original instruction, the projector rule instruction and the at least one peripheral device rule instruction.

10. The electronic system as claimed in claim 8, wherein the processor is configured to:

in response to detecting a change of the at least one peripheral device connected to the communication interface, obtain at least one updated device description through the communication interface and transmit the at least one updated device description to the cloud server, so that the natural language model generates the corresponding at least one peripheral device rule instruction according to the at least one updated device description.

11. The electronic system as claimed in claim 8, wherein the cloud server is configured to:

associate and store the at least one peripheral device rule instruction with the projection device; or associate and store the at least one peripheral device rule instruction with a user account of the projection device.

12. The electronic system as claimed in claim 8, wherein the at least one peripheral device rule instruction comprises at least one of a product type of the at least one peripheral device and a description of the communication interface connected to the at least one peripheral device.

13. The electronic system as claimed in claim 8, wherein the processor is configured to:

in response to receiving a voice signal, transmit the voice signal to the natural language model through the communication interface, and use the voice signal as the original instruction.

14. The electronic system as claimed in claim 8, wherein the processor is configured to:

in response to receiving a voice signal, convert the voice signal into the original instruction in a text form; or in response to receiving the voice signal, transmit the voice signal to a cloud server, so that the cloud server converts the voice signal into the original instruction in the text form; or the electronic system further comprises a terminal device coupled to the projection device, and the terminal device is configured to:

in response to receiving the voice signal, convert the voice signal into the original instruction in a text form; or in response to receiving the voice signal, transmit the voice signal to a cloud server, so that the cloud server converts the voice signal into the original instruction in the text form.

15. The electronic system as claimed in claim 8, wherein the processor is configured to convert the at least one standard instruction into corresponding at least one control code to execute the at least one control code to control the at least one peripheral device, wherein the at least one control code corresponds to the operation required by the original instruction, or the electronic system further comprises a cloud server, and the cloud server is configured to convert the at least one standard instruction into the corresponding at least one control code, and transmit the at least one control code to the projection device, so that the projection device executes the at least one control code to control the at least one peripheral device.

* * * * *